C. J. McGURN & C. L. TANNER.
NUT LOCK.
APPLICATION FILED MAY 20, 1916.
1,212,143.
Patented Jan. 9, 1917.
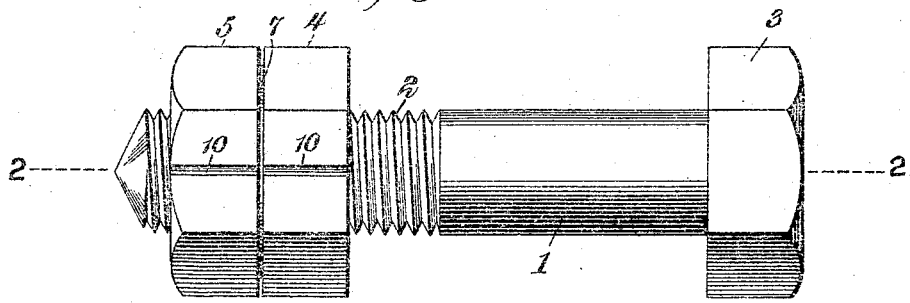
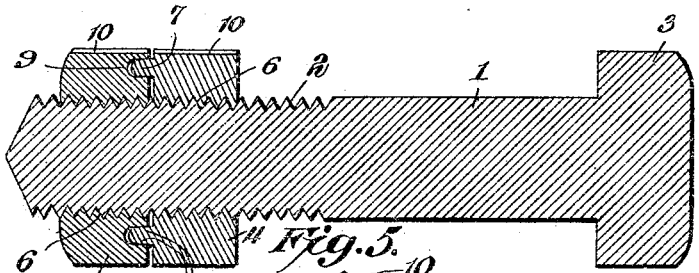
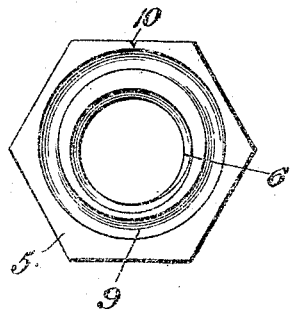
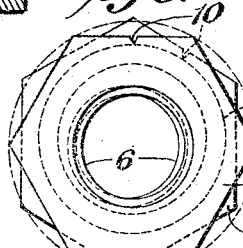
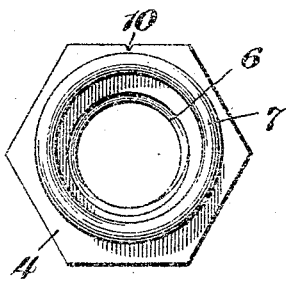
WITNESSES
Howard D. Orr
F. T. Chapman
C. J. McGurn
and C. L. Tanner
INVENTORS
BY
C. G. Siggers
ATTORNEY

UNITED STATES PATENT OFFICE.

CHRISTOPHER J. McGURN AND CLARK L. TANNER, OF MILES CITY, MONTANA.

NUT-LOCK.

1,212,143. Specification of Letters Patent. Patented Jan. 9, 1917.

Application filed May 20, 1916. Serial No. 98,870.

*To all whom it may concern:*

Be it known that we, CHRISTOPHER J. McGURN and CLARK L. TANNER, citizens of the United States, residing at Miles City, in the county of Custer and State of Montana, have invented a new and useful Nut-Lock, of which the following is a specification.

This invention has reference to nut locks, and its object is to provide a nut lock which cannot work loose from the threaded bolt or shank to which it is applied.

In accordance with the present invention the threaded shank, which may be a threaded stem of any kind or the threaded stem of a bolt, is of standard size and need not differ from threaded shanks as ordinarily produced. Two nuts are provided, one constituting the holding nut and the other the lock nut, but the arrangement is such that both nuts must be applied or removed from the shank at the same time, for neither nut can be moved with relation to the other nut except for a small fractional part of a turn. The two nuts are threaded to fit the threaded shank and one nut is provided in one face with a circular groove eccentric to the axis of the threaded passage through the nut, and the other nut is provided with a circular rib on one face eccentric to the axis of the threaded passage through the nut. The groove and tongue or rib have the same degree of eccentricity and the tongue is made of an axial length greater than the pitch of the threads, so that the nuts will jamb upon the threaded shank when rotated to an extent less than one complete turn. In this manner the nuts must have a certain relation to each other when applied to the threaded shank or when removed therefrom, and consequently the two nuts are provided with suitable indicia showing the necessary relation of the nuts for application to or removal from the threaded shank.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings: Figure 1 is a plan view of an ordinary machine bolt with the locking nuts applied thereto and related for ready application to or removal from the threaded shank of the bolt. Fig. 2 is a section on the line 2—2 of Fig. 1. Fig. 3 is a face view of the lock nut member provided with an eccentric groove in one face. Fig. 4 is a similar view of the other lock member provided with an eccentric rib. Fig. 5 is a more or less diagrammatic view of the two nut members when in locking position.

Referring to the drawings there is shown a shank 1 having a threaded portion 2, and in the particular showing of the drawings the shank 1 is provided with a head 3 after the manner of an ordinary bolt. The shank 1, however, may represent any threaded shank to which it is desired to apply a nut and to lock the nut in position. It is customary to produce threaded shanks and nuts in certain standard sizes having standard numbers and pitch of threads. For instance, if the shank 1 be considered as an inch in diameter, the threaded end 2 may have the pitch of the threads equal to eight threads to the inch, or it may have a coarser or a finer pitch. For convenience of description the shank 1 may be considered as of an inch in diameter with eight threads to the inch, and may in all respects be a standard bolt shank or standard threaded shank.

The lock nut structure comprises two nut members 4, 5, respectively, and in general appearance these two nut members may correspond to ordinary standard nuts either of hexagon outline, as indicated in the drawings, or of any other desired shape. The nuts have each a central threaded passage 6 to fit the threaded nut 2 of the shank, and in this respect need not differ from ordinary standard nuts. One nut member, say, the member 4, has on one face an axially extended circular rib 7 eccentrically arranged with respect to the axis of the threaded passage 6. The rib 7 has substantially parallel side walls 8 and the rib is spaced a short distance from the threaded passage 6. In one face of the nut member 5 there is produced a circular groove 9 eccentric to the axis of the passage 6 and of a size and shape to receive the rib 7 snugly yet freely, some slight play being permissible. The eccentricity of the rib 7 and groove 9 with relation to the axis of the respective nut members is the same. Produced on one face of each nut member is a groove 10 or other indication with the mark 10 on the nut section 4 having the same relation to the rib 7 as the mark 10 on the nut member 5 has to the groove 9. When the marks 10 of the two nut members 4 and 5 coincide, the threaded passages 6 through the two nut members are in alinement, but when these marks are out of coincidence the passages 6 are correspondingly out of alinement.

In order to place the two nut members upon the threaded shank 2, they are first assembled face to face with the rib 7 seated in the groove 9 and the indicating means 10 coinciding, and then the two nut members are screwed upon the shank 2 simultaneously as though constituting a single integral nut, and the screwing of the nut members upon the shank is continued until the nut members are properly seated, the coincidence of the indicia 10 being maintained.

The relation of the threads in the two passages 6 is such that the adjacent faces of the two nut members when on the threads 2 do not actually touch, but are spaced apart a short distance. When the nut members have been screwed on to the threaded end 2 of the shank to the proper extent, the nut member 5 is then screwed in either direction, whereupon the eccentricity of the rib or tongue 7 and the groove 9 causes a displacement of the nut member 5 with relation to the nut member 4 and to the threaded portion 2 of the shank, causing a binding of the nut member 5 on the shank and also to the nut member 4, and in turn binding the latter to the threaded end 2 of the shank so that both nut members become firmly cramped on to the threaded shank 2 without longitudinal displacement of the nut member 4. Because of the pitch of the screw threads, the wedging action of the threads themselves is very pronounced and the line of pressure on the threads is so nearly perpendicular to the length of the threads themselves that there is but slight tendency to return the screw member 5 toward the position from which it was turned in causing the locking of the nuts. If, however, either nut member should become loosened it quickly binds again after having moved but a short distance beyond the point of coincidence of the indicia 10. This turning movement of one nut member independently of the other is too slight to permit the escape of the tongue or rib 7 from the groove 9, or even any material withdrawal of the tongue 7 from the groove 9, so that the parallel walls of the tongue and groove are at all times in position to engage.

Since it is always customary to make nuts and threaded shanks for receiving them with a relatively loose or free fit to facilitate the screwing of the nuts on to or from the threaded shanks, there is in commercial structures some play between the nuts and the threaded shanks. The two nut members when placed upon the threaded shank with the indicia 10 in coincidence are, therefore, separated at their contiguous faces by a short space which is ample to permit the turning of the locking nut member, which may be the member 5, for a fractional part of a turn independently of the nut member 4 and the movement may be in either direction. Because of the loose fit referred to, and in order that the tongue 7 may have ample bearing in the groove 9 without liability of being sprung therefrom, it is customary to make the tongue 7 about one and one-half times the distance between two adjacent turns of the screw. For instance, if the threaded shank has eight threads to the inch, so that the turns are separated by one-eighth of an inch, it is customary to make the tongue about three-sixteenths of an inch in axial extent, and the groove 9 is made correspondingly deep. If the threads be larger or smaller in number or pitch, the tongue may have its axial length varied accordingly. This renders it impossible to apply one nut member and then apply the other nut member and cause it to lock with the first nut member. The two nut members must be applied simultaneously and must be removed simultaneously when in approximately the alined position, some slight variation therefrom being permissible because accuracy of fit is not demanded.

What is claimed is:—

1. A nut lock comprising two similar nut members with one member having a circular tongue projecting from one face in eccentric relation to and surrounding and spaced from the threaded passage through the nut member, and the other nut member having a circular groove produced in the face toward the first nut member and similarly eccentric to and surrounding and spaced from the threaded passage through the second member to receive the tongue of the first nut member, the tongue and groove each having their opposite walls parallel.

2. A nut lock comprising two similar nut members with one member having a circular tongue projecting from one face in eccentric relation to and surrounding and spaced from the threaded passage through the nut member, and the other nut member having a circular groove produced in the face toward the first nut member and similarly eccentric to and surrounding and spaced from the threaded passage through the second member to receive the tongue of the first nut member, the tongue and groove each having their opposite walls substantially parallel, and the axial length of the tongue and the axial depth of the groove receiving it being greater than the spacing of two adjacent threads and less than the spacing of three threads.

CHRISTOPHER J. McGURN.
CLARK L. TANNER.

Witnesses:
CARRIE B. GEMER,
P. R. HILL.